Oct. 13, 1931.  H. W. KLINE  1,827,590
COURSE FINDING SYSTEM FOR AIRCRAFT
Filed Nov. 21, 1930
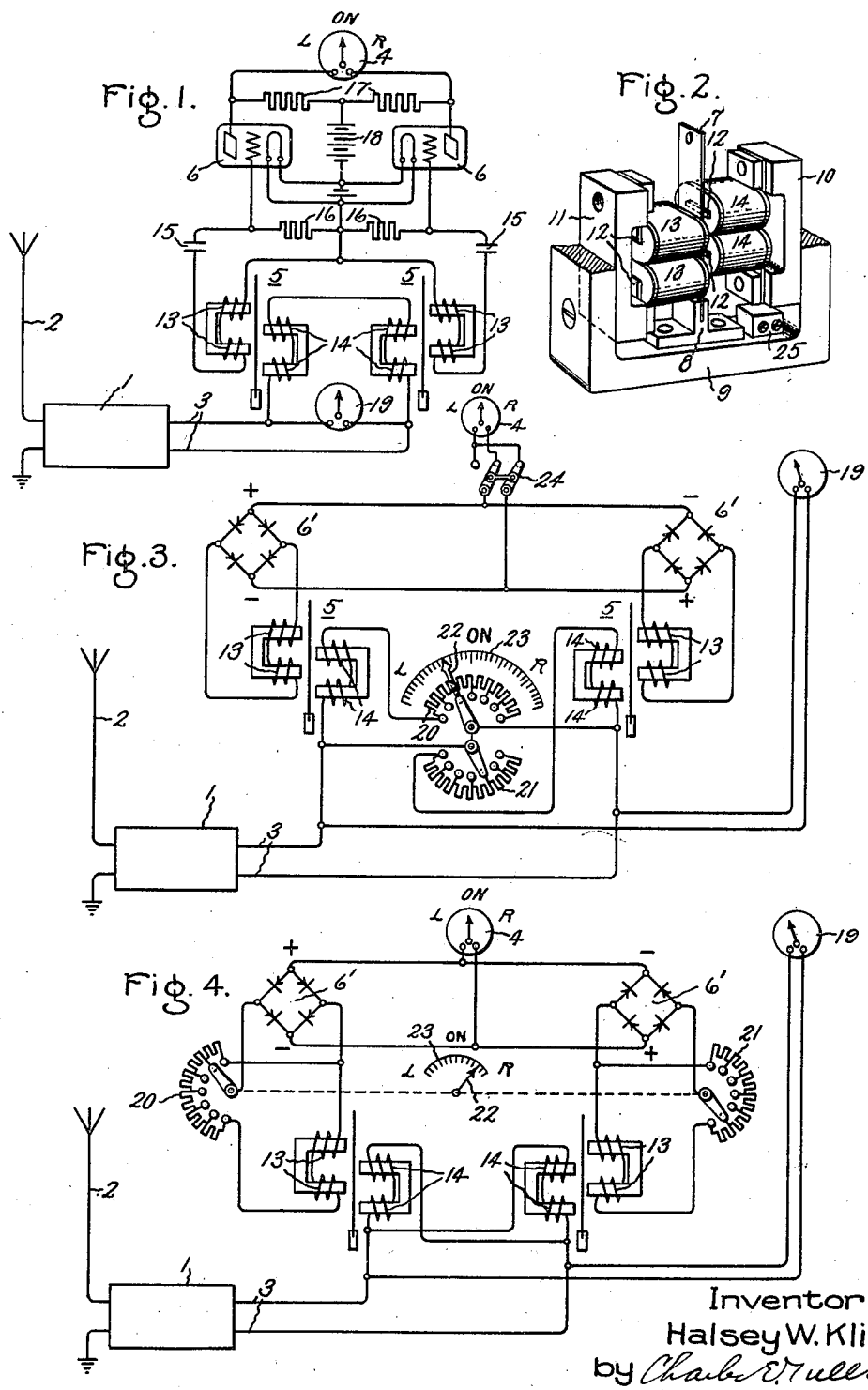
Inventor:
Halsey W. Kline,
by Charles E. Muller
His Attorney.

Patented Oct. 13, 1931

1,827,590

UNITED STATES PATENT OFFICE

HALSEY W. KLINE, OF SCHENECTADY, NEW YORK, ASSIGNOR TO GENERAL ELECTRIC COMPANY, A CORPORATION OF NEW YORK

COURSE FINDING SYSTEM FOR AIRCRAFT

Application filed November 21, 1930. Serial No. 497,215.

My invention relates to course finding systems for aircraft and it has for one of its objects to provide improved means for use on aircraft whereby an indication of the route to be followed may be obtained.

More particularly my invention relates to means for use on aircraft in cooperation with ground radio beacons of the type in which radio carrier waves modulated by currents of different frequencies are transmitted from a known point in different directions in accordance with the route to be followed by the guided craft, radio waves modulated with one frequency being transmitted in a direction lying on one side of the route to be followed by the craft and radio waves modulated by currents of another frequency being transmitted in a direction lying on the opposite side of the route to be followed. The course to be followed is then determined by the zone in which these radio waves are received with equal intensity. This zone of course may be determined upon the craft by demodulating the received carrier waves and comparing the intensities of the demodulation components.

Still more particularly my invention has for one of its objects to provide an improved selective means for use upon the craft whereby the different demodulation components may be efficiently selected from the output of a carrier wave receiver and accurately compared. A further object is to provide means of the type indicated which is extremely sensitive to variations in the intensity of the selected demodulation components.

The novel features which I believe to be characteristic of my invention are set forth with particularity in the appended claims. My invention itself, however, both as to its organization and method of operation, together with further objects and advantages thereof may best be understood by reference to the following description taken in connection with the accompanying drawings in which Figs. 1, 3, and 4 represent different embodiments of my invention, and Fig. 2 represents a portion thereof.

Referring to the drawings, I have conventionally indicated at 1 a radio receiver which may be carried by the craft and which is adapted to receive modulated carrier waves from a ground radio beacon by means of an antenna 2, which may be of any suitable type used upon aircraft. This receiver is adapted to demodulate the received carrier waves and is provided with an output circuit indicated at 3 in which the demodulation components flow.

Thus, for example, if we assume that the system is one adapted to cooperate with an air beacon which transmits a carrier wave modulated with currents having a frequency of, for example, 65 cycles, in a direction lying on one side of a course to be followed by the craft and a carrier wave modulated by currents having a frequency of 86 cycles in a direction lying at the opposite side of the course to be followed, both of these carrier waves will be received by the receiver 1 and the demodulation components, that is, currents of the frequency of 65 and 86 cycles, will appear in the output circuit 3. The intensity of these currents is dependent upon the position of the craft with reference to the predetermined course. Thus, if the craft is upon its proper course, the currents will be of equal intensity, whereas if the craft is at the right or at the left of the course, the current of one or the other of these two frequencies will be of greater intensity in the output circuit.

At 4 I have shown a course indicating instrument which may suitably be mounted upon the instrument board of the cock-pin of the craft. This instrument is provided with a needle which is arranged to remain at the center of the scale when the craft is on its course, and to deflect either to the right or left when the craft respectively is on the right or left side of its course. Uni-directional electromotive force is supplied to this meter having intensity and polarity dependent upon the relative intensities of the two received demodulation components by means comprising mechanical frequency selectors 5 and, in the form shown in Fig. 1, vacuum tube rectifiers 6.

The structure of the mechanical frequency selector is shown in detail in Fig. 2 and comprises a vibrating reed 7 having a natural period of vibration corresponding to the frequency to be selected. Thus, for example, in the case assumed, the reed used in the left hand selector 5 may have a natural frequency of 65 cycles, whereas the reed used in the right hand selector 5 may have a natural frequency of 86 cycles. This reed is supported at its lower end by means of a member 8 which is attached to a non-magnetic base member 9. On opposite sides of the reed 7 are arranged permanent magnets 10 and 11. To each of the opposite poles of each of these permanent magnets is attached a pole piece 12, a suitable coil winding, or spool, 13, 14 being arranged upon each pole piece. The ends of the pole pieces opposite the permanent magnets are arranged adjacent the vibratory member 7 but are spaced at a sufficient distance therefrom to permit a desired amplitude of vibration of the vibratory member. Thus the permanent magnets 10 and 11 together with their pole pieces form a magnet essentially U-shaped abutting on the vibratory reed 7.

It has been found that a very much improved operation of the device may be had when the pole pieces upon opposite sides of the vibratory member 7 are offset, as shown in the drawings; that is, so that one of the pole pieces of one magnet is about midway between the two pole pieces of the opposite magnet; the magnets and pole pieces being of similar dimensions and arrangement. In this way any electrical coupling between the coils on opposite sides of the vibrating member 7 is obviated, the sole coupling effect between the coils on opposite sides being due to mechanical vibration of the member 7. To further eliminate electrical coupling between the coils the vibrating member 7 which of course is of magnetic material, is made of width substantially equal to the width of the pole pieces. In this way the vibratory member is effective as a shield between the opposite coils 13 and 14.

One manner in which the mechanical selector may be connected in circuit is shown in Fig. 1 in which it will be seen that the coils on one side of each of the two vibrating reeds of the two selectors are connected in series with the output circuit of the radio receiver 1 thereby to act as the exciting coils of the respective vibratory members. The other coil of each selector is connected in series between the cathode and grid of the respective electron discharge rectifier 6 through a suitable coupling condenser 15. A suitable grid leak resistance 16 is also connected between the grid and cathode of each of the discharge devices 6. The anode of each of the discharge devices 6 is connected to the cathode thereof through an individual resistance 17 and a source of anode potential 18.

With the circuit as thus arranged, the current flowing in each of the resistances 17 in the anode circuit of the discharge devices 6 is of magnitude dependent upon the intensity of the alternating electromotive force which is supplied to the grid of the discharge device. The meter 4 is connected between the two anodes of the discharge devices 6 and therefore receives a uni-directional electromotive force having a polarity and magnitude dependent upon the relative intensities of the two currents of different frequencies.

Thus, for example, let us assume that the craft is at the right of its course. The two reeds of the selectors 5 will of course vibrate, one at 65 cycles and the other at the 86-cycle frequency. Electromotive force of the corresponding frequency is then induced into the pick-up windings 13 which are associated with these vibrating members due to the mechanical movement of the vibrating member in the magnetic field through the pole pieces established by the permanent magnets. The reed of the right hand selector will vibrate with greater amplitude than that of the left hand selector because of the greater intensity of the received carrier wave due to the craft being at the right of its course. Accordingly, the alternating current supplied to the grid of the right hand discharge device 6 is of greater intensity than that supplied to the grid of the left hand discharge device, and the current flowing in the output of this discharge device will then be of proportionally smaller magnitude than that flowing in the output of the left hand discharge device. The right hand terminal of the meter 4 will then be at negative potential with respect to its left hand terminal with the result that the needle of the meter will deflect to the right.

If we assume that the craft is at the left of the course then the vibrating member of the left hand selector 5 will vibrate with greater intensity with the result that the pointer of the meter 4 will deflect to the left.

It has been found that with an arrangement of the type shown very slight variations in the intensities of the two received frequencies may be detected by the meter 4. Thus any small deviations of the craft from its proper course are immediately apparent to the operator from the meter. In fact, it has been found that the meter 4 is sensitive to variations in amplitude of the vibrating members of the selectors 5 which are much smaller than the smallest variations which are noticeable to the eye.

It has been found further, that with the arrangement described the electromotive force applied to the meter 4 is accurately proportional to the relative intensity of two received audio frequency waves. Thus, if desired, the meter 4 may be calibrated in degrees both to the left and to the right of the center point whereby it provides an indication of the number of degrees which the craft deviates from its course. To make accurate determinations of the degree of deviation from the course, however, it is desirable to provide a meter 19 connected across the output circuit 3 thereby to indicate the intensity of the received audio frequency. This intensity should then be adjusted to a predetermined value, either by manual or automatic volume control means, not shown, which are provided in the receiver 1 when readings of the meter 4 are to be taken.

In Fig. 3 I have shown a more improved form of the invention in which the electron discharge rectifiers are replaced by rectifiers of the contact type; such as those comprising a copper disc having cupreous oxide formed thereon and mounted between suitable electrodes as shown, for example, in Patent No. 1,640,335 to Lars O. Grondahl, issued Aug. 23, 1927. Of course other uni-directional conducting devices may be used as well. These rectifiers are connected in bridge arrangement, each of the pick-up coils 13 being connected across one diagonal of one of the bridges and the meter 4 being connected across the opposite diagonals of each of the bridges. The rectifiers in these bridge arrangements, however, are so polarized that current supplied to the meter 4 by one of the bridge arrangements is of opposite polarity to that supplied by the other bridge arrangement.

The arrangement shown in Fig. 3 is further modified in that the exciting coils 14 of the mechanical selectors 5 are connected in parallel, each coil having connected in series therewith, if desired, a variable resistance 20 and 21. These resistances may preferably be in the form of rheostats, the movable contact arms of which are mounted upon a common shaft and which are so arranged that when the two arms occupy the central position, about equal resistance is inserted in circuit with each of the two exciting coils. When the contact arms are moved in a counter-clockwise direction, resistance is removed from the circuit of the left hand exciting coil and is inserted in circuit with the right hand exciting coil. One of these contact arms is provided with an index 22 which moves over a scale 23 which may be calibrated in degrees from the center to the left or right in the manner described in connection with the meter 4. In accordance with one manner of utilizing the invention if we assume that the contact arms of the rheostats 20 and 21 are in their central position, and the meter 4 reads "On", this indicates that the two received frequencies are of equal intensity and that the craft therefore is on its course. If the craft now deviates either to the left or right, the needle of the meter 4 will correspondingly deviate from its central position. The operator will then adjust the rheostats 20 and 21 until the meter 4 again reads "On".

The amount of adjustment of the resistances 20 and 21 necessary to produce this reading of the meter 4 is proportional to the angle of deviation of the craft from its course, this angle being determined from the position of the index 22 upon the scale 23.

In this figure reversing switch 24 is shown in the circuit of 4 thereby to cause the meter to produce similar indications whether the craft is approaching or leaving the guiding beacon. Thus when the craft is leaving the locality of the beacon the switch will be in the opposite position from that which it occupies when approaching the beacon.

The arrangement shown in Fig. 4 is similar to that shown in Fig. 3 with the exception that the rheostats 20 and 21 are connected as potentiometers in circuit with the pick-up coils 13. The resistance of each of these rheostats is connected in parallel with the respective coils 13 and the electromotive force appearing between the adjustable contact arm and one terminal of the respective coil being supplied across one of the diagonals of the bridge. The index 22 is arranged upon the shaft of the two rheostats and moves over dial 23 which may be calibrated in degrees from a central point to the left or right.

It will of course be apparent that the angle of deviation of the craft from the course may be determined from the meter 4 in the manner described in connection with Fig. 1, the audio output from receiver 1 being held at a predetermined value as indicated by meter 19. Of course, if this operation be preferred, the resistances 20 and 21 may be omitted from the circuit, or alternatively their contact arms may be set at the central position.

The forms of the invention shown in Figs. 3 and 4, it will be noted, are characterized by extreme simplicity, compactness, and ruggedness of construction. The two frequency selectors 5 may be mounted upon the craft side by side in the form of a cube of dimensions in the order of 3½ or 4 inches. The copper oxide rectifiers 6' may be mounted within the frame of the respective selector as indicated by the cube 25 of Fig. 2. In addition to these advantages any erratic operation likely to result from the use of electron discharge devices or errors due to different characteristics thereof or adjustment of the circuits, applied voltages, etc., are obviated, a smooth and dependable operation being had from the arrangement of the latter figures.

While I have shown different particular embodiments of my invention, it will of course be understood that I do not wish to be limited thereto since many modifications may be made both in the circuit arrangements and the instrumentalities employed, and that I contemplate by the appended claims to cover any such modifications as fall within the true spirit and scope of my invention.

What I claim as new and desire to secure by Letters Patent of the United States is:

1. In a course finder for aircraft, a plurality of vibratory members carried by an aircraft, each of said members having a natural period of vibration, exciting means therefor, means for supplying to said exciting means currents transmitted from a ground station having different frequencies and having relative intensity dependent upon the position of the craft with reference to a predetermined course, the natural period of each of said members corresponding to one of said frequencies whereby each member vibrates with amplitude dependent upon the intensity of the supplied current having its respective frequency, means associated with each vibratory member for producing a unidirectional electromotive force having magnitude dependent upon the amplitude of vibration of the respective vibratory member, and means responsive to the relative magnitudes of said uni-directional electromotive forces.

2. In a course finder for aircraft, a plurality of vibratory members carried by an aircraft, each of said members having a natural period of vibration, exciting means therefor, means for supplying to said exciting means currents transmitted from a ground station having different frequencies and having relative intensity dependent upon the position of the craft with reference to a predetermined course, the natural period of each of said members corresponding to one of said frequencies whereby each member vibrates with amplitude dependent upon the intensity of the supplied current having its respective frequency, means for producing a unidirectional electromotive force having magnitude and polarity dependent upon the relative amplitude of vibration of said members, and means operable responsive to the magnitude and polarity of said unidirectional electromotive force.

3. In a course finder for aircraft, a plurality of vibratory members carried by the craft, said members having different natural periods of vibration and each member being interposed between a pair of coils, each coil being wound on a core of U shape, the north and south poles of each core being arranged adjacent the vibratory member and the poles of each core being offset along the length of the respective vibratory member with respect to the poles of the opposite core, means for supplying to one coil of each pair currents having frequencies corresponding to the natural periods of said vibratory members and having relative intensities dependent upon the position of the craft with reference to a predetermined course, means to rectify the electromotive force induced in the opposite coil of each pair by virtue of mechanical vibration of said interposed vibratory member, and indicating means responsive to the relative intensities of the rectified electromotive force.

4. In a course finder for aircraft, a pair of vibratory members carried by an aircraft, each of said members having a low natural frequency of vibration, exciting means therefor, means for supplying to said exciting means currents transmitted from a ground station having different low frequencies, and having relative intensity dependent upon the position of the craft with reference to a predetermined course, the natural period of each of said members corresponding to one of said frequencies whereby each member vibrates with amplitude dependent upon the intensity of the supplied current having its respective frequency, means associated with each vibratory member for generating an alternating electromotive force in accordance with the vibrations of each of said members, a pair of rectifiers, each rectifier comprising a copper plate having cupreous oxide formed thereon and connected to rectify the alternating electromotive force generated by one of said means, a meter, and connections whereby the rectified electromotive force is supplied from each of said rectifiers to said meter with opposite polarities.

In witness whereof I have hereunto set my hand this 20th day of November, 1930.

HALSEY W. KLINE.